D. H. LANGAN.
LOCK NUT.
APPLICATION FILED MAR. 9, 1911.

1,010,503.

Patented Dec. 5, 1911.

Witnesses

D. H. Langan,
Inventor by C. A. Snow & Co.
Attorneys

COLUMBIA PLANOGRAPH CO., WASHINGTON, D. C.

UNITED STATES PATENT OFFICE.

DAVID HEWIT LANGAN, OF GAINES, PENNSYLVANIA.

LOCK-NUT.

1,010,503.  Specification of Letters Patent.  Patented Dec. 5, 1911.

Application filed March 9, 1911. Serial No. 613,230.

*To all whom it may concern:*

Be it known that I, DAVID H. LANGAN, a citizen of the United States, residing at Gaines, in the county of Tioga and State of Pennsylvania, have invented a new and useful Lock-Nut, of which the following is a specification.

It is one object of this invention to provide a transversely severed spring nut, the ends of which are adapted to be engaged successively by a tool, to secure a loosening of the nut during the rotation of the nut.

A further object of the invention is to provide a transversely severed spring nut of novel and improved form, and to provide an applying tool therefor, adapted to secure at once, a rotation of the nut and a radial expansion of the nut.

Figure 1:
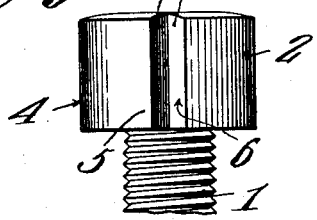
Figure 2:
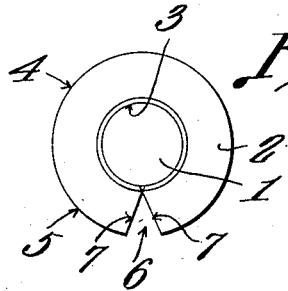
Figure 3:
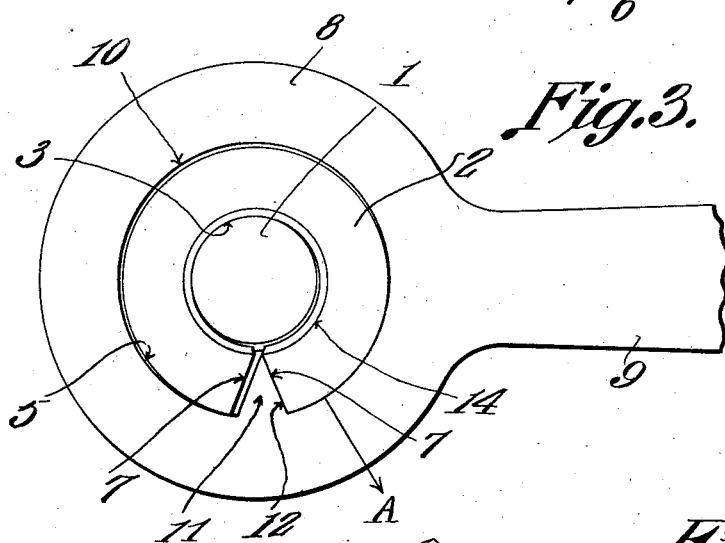
Figure 4:
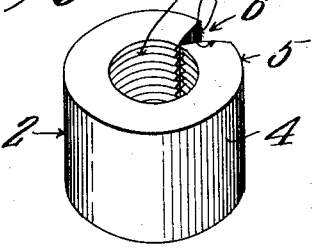
Figure 5:
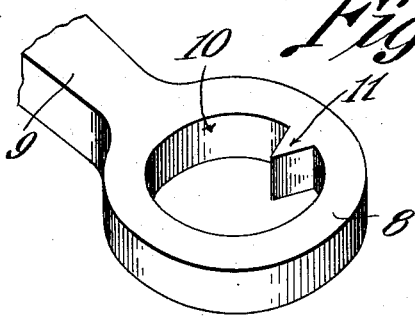

In the drawings,—Figure 1 is a side elevation showing a fragment of a bolt, with the nut of the present invention mounted thereon; Fig. 2 is an end elevation of a bolt, with the nut applied thereto; Fig. 3 is an end elevation showing the bolt, the nut thereon, and the tool in the operation of manipulating the nut; Fig. 4 is a detail perspective of the nut; and Fig. 5 is a detail perspective of the tool whereby the nut is manipulated.

In the drawings, the numeral 1 denotes a portion of the bolt, threaded in the usual manner to receive the nut 2, the latter being internally threaded as shown at 3, to engage with the bolt 1. The outer face of the nut 2 is circular, as shown at 4, the periphery 5 of the nut being, of course likewise circular. The nut 2 is transversely severed at a single point, by a V shaped notch 6, defining the ends of the nut, the walls 7 of the notch 6 converging toward the center of the nut.

The applying tool comprises a head 8 and a radial handle 9. The head 8 is provided with a circular bore 10, of slightly larger diameter than the external diameter of the nut 2. Projecting radially from the head 8, into the bore 10, is a pointed tooth or projection 11.

The operation of the structure will be most clearly understood from an examination of Fig. 3.

In practical operation, the nut 2 is inserted into the bore 10 of the head 8 of the applying tool, the tooth 11 registering in the notch 6 severing the nut 2 at one point. When the handle 9 is manipulated, the head 8 will have a slight rotation upon the nut 2, by reason of the fact that the diameter of the bore 10 is somewhat larger than the external diameter of the nut 2. This relative rotation between the applying tool and the nut, will permit one of the side faces of the tooth 11 to bear against one of the end faces 7 of the nut 2, as indicated at 12. This engagement at 12 will cause one end of the nut 2 to loosen up slightly with respect to the bolt 1, as shown at 14, the rotation of the nut 2 upon the bolt 1 being a matter carried forward without difficulty. As soon as the rotation of the applying tool ceases, the nut 2, being a spring structure, will embrace the bolt 1 tightly, and be held thereon. It is obvious that, no matter in which direction the handle 9 is rotated, the nut 2 will be loosened upon the bolt 1, one end of the nut or the other, being sprung away from the bolt 1, depending upon the direction of rotation of the handle 9.

It will be seen that in the first instance, the head 8 of the applying tool will have slight rotation upon the nut 2, this slight relative rotation between the nut and the applying tool producing a radial expansion in the nut 2, whereby the nut will be loosened upon the bolt 1.

Owing to the fact that the notch 6 in the nut 2 is V shaped, and owing to the fact that the projection or tooth 10 upon the applying tool is V shaped, the pressure exerted by the tooth 11 against one end face 7 of the nut 2, when the parts are positioned as shown in Fig. 3, will be distributed evenly over the entire end face 7 which is engaged, as shown at 12, with the tooth 11.

The difference in diameter between the bore 10 of the applying tool and the nut 2, permits one end of the nut 2 to swing outwardly in the direction of the arrow A of Fig. 3, under the action of the applying tool, thus loosening the nut upon the bolt 1, as shown at 14.

Having thus described the invention, what is claimed is:—

1. In a device of the class described, a spring nut transversely severed to define the ends of the nut; and a tool rotatable upon the nut and having a projection to register between the ends of the nut.

2. In a device of the class described, a spring nut transversely severed to define the ends of the nut; and a tool having an opening in which the nut is rotatable, there being a projection upon the tool, adapted to register between the ends of the nut, the diameter of the opening being greater than the diameter of the nut, to provide for a springing of the nut under the engagement between the projection and one end of the nut.

3. In a device of the class described, a circular nut transversely severed to define the ends of the nut; and a tool having a circular opening to receive the nut, there being a projection upon the tool, adapted to register between the ends of the nut.

4. In a device of the class described, a nut and a tool to inclose the nut, the nut and the tool having relative rotatory movment; the nut being transversely severed to define the ends of the nut, and the tool having a projection to register between the ends of the nut.

5. In a device of the class described, a nut and a tool to inclose the nut, the tool having rotatory movement with respect to the nut, and the nut having radial expansion within the tool; the nut being transversely severed to define the ends of the nut, and the tool having a projection adapted to register between the ends of the nut to secure radial expansion of the nut when the tool is rotated upon the nut.

6. A spring nut transversely severed to define the ends of the nut, and a tool adapted to engage between the ends of the nut to secure both a rotation of the nut and a radial expansion of the nut.

In testimony that I claim the foregoing as my own, I have hereto affixed my signature in the presence of two witnesses.

DAVID HEWIT LANGAN.

Witnesses:
F. E. REINWALD,
J. D. BARNHART.

---

Copies of this patent may be obtained for five cents each, by addressing the "Commissioner of Patents, Washington, D. C."